United States Patent
Wu et al.

(10) Patent No.: US 8,305,743 B2
(45) Date of Patent: Nov. 6, 2012

(54) CURVED DISPLAY PANEL AND METHOD FOR MANUFACTURING THE SAME

(75) Inventors: Jer-Yao Wu, Hsin-Chu (TW); Han-Ping Kuo, Hsin-Chu (TW); Cheng-Yi Su, Hsin-Chu (TW); Jong-Wen Chwu, Hsin-Chu (TW); Yu-Chen Liu, Hsin-Chu (TW); Chih-Wei Chen, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 777 days.

(21) Appl. No.: 12/334,748

(22) Filed: Dec. 15, 2008

(65) Prior Publication Data

US 2009/0284904 A1    Nov. 19, 2009

(30) Foreign Application Priority Data

May 16, 2008  (TW) ............................ 97118077 A
Oct. 15, 2008  (TW) ............................ 97139568 A (51) Int. Cl.
  H05K 5/00    (2006.01)
  H05K 1/00    (2006.01)
  H05K 1/03    (2006.01)
  G02F 1/1333  (2006.01)
  H01J 9/26    (2006.01)
  G11B 5/48    (2006.01)

(52) U.S. Cl. ................ 361/679.21; 361/749; 361/750; 361/751; 174/254; 174/255; 174/256; 349/110; 445/25; 360/245.9

(58) Field of Classification Search ............. 361/679.01, 361/679.21; 349/110; 445/25
See application file for complete search history.

(56) References Cited

U.S. PATENT DOCUMENTS

| | | | | |
|---|---|---|---|---|
| 5,273,475 A * | 12/1993 | Oshikawa | ........................ | 445/24 |
| 5,568,297 A * | 10/1996 | Tsubota et al. | ............... | 156/145 |
| 5,846,110 A * | 12/1998 | Kanagu et al. | .................. | 445/25 |
| 5,990,618 A * | 11/1999 | Morita et al. | .................. | 313/582 |
| 6,639,638 B1 * | 10/2003 | Kodnani et al. | ............... | 349/110 |
| 6,865,033 B2 | 3/2005 | Laverty | | |
| 7,834,962 B2 * | 11/2010 | Satake et al. | ................... | 349/110 |
| 2004/0179165 A1 | 9/2004 | Kinoshita et al. | | |
| 2007/0030439 A1 | 2/2007 | Kinoshita et al. | | |
| 2008/0193717 A1 | 8/2008 | Jongerden et al. | | |
| 2008/0289859 A1* | 11/2008 | Mikado et al. | ................. | 174/254 |
| 2009/0122223 A1* | 5/2009 | Hayano et al. | .................. | 349/58 |

FOREIGN PATENT DOCUMENTS

| | | |
|---|---|---|
| CN | 1612185 A | 5/2005 |
| CN | 1808240 A | 7/2006 |
| JP | 1994160820 A | 7/1994 |
| JP | 10260398 A | 9/1998 |
| TW | 200401135 A | 1/2004 |
| TW | 200642842 A | 12/2006 |

* cited by examiner

Primary Examiner — Jayprakash N Gandhi
Assistant Examiner — Jerry Wu
(74) Attorney, Agent, or Firm — Chun-Ming Shih (57) ABSTRACT

A curved display panel includes a display module, a first fixing substrate and an adhering material. The display module has a first glass plate. The first glass plate has a first curved surface. The first fixing substrate has a second curved surface facing the first curved surface. The adhering material is connected between the first curved surface and the second curved surface.

26 Claims, 6 Drawing Sheets

CURVED DISPLAY PANEL AND METHOD FOR MANUFACTURING THE SAME

BACKGROUND

1. Field of the Invention

The present invention relates to a display panel, and more particularly to a curved display panel and a method for manufacturing the curved display panel.

2. Description of the Related Art

Because flat panel display devices have advantages of light in weight, small in size, low in power consumption and non-radiation, the flat panel display devices have gradually replaced the cathode ray tube display devices and utilized in various electronic products.

There are many types of the flat panel display devices, such as liquid crystal display devices, organic light emitting diode display devices, electronic paper display devices and light emitting diode display devices. Taking the liquid crystal display device as an example, the liquid crystal display includes a liquid crystal display module and a backlight module. The liquid crystal display module mainly includes a color filter substrate, a thin film transistor substrate and a liquid crystal layer disposed between the color filter substrate and the thin film transistor substrate.

In addition, many consumer electronics products have been developed to achieve not only perfect function but also artistic design based on novelty and fashion. The consumer may pay much attention to the design and shape of the products other than the function of the products. For example, a curved display device manufactured by bending the liquid crystal display module has been provided. Generally, a method of bending the liquid crystal display module is performed by directly exerting force to act on the liquid crystal display module. However, both of the color filter substrate and the thin film transistor substrate of the liquid crystal display module have glass substrates, and when the force is directly acted on the glass substrates, the liquid crystal display module may be broken and damaged due to stress concentration.

Therefore, what is needed is to provide a curved display panel and a method for manufacturing the curved display panel that can overcome the above shortcomings.

BRIEF SUMMARY

The present invention relates to a curved display panel and a method for manufacturing the curved display panel that can improve product yield.

To achieve the above-mentioned advantage, the present invention provides a curved display panel. The curved display panel includes a display module, a first fixing substrate and an adhering material. The display module has a first glass plate. The first glass plate has a first curved surface. The first fixing substrate has a second curved surface facing the first curved surface. The adhering material is connected between the first curved surface and the second curved surfaces.

To achieve the above-mentioned advantage, the present invention provides a method for manufacturing a curved display panel. The method includes: providing a display module having a first glass plate; providing a first fixing substrate; aligning the first glass plate and the first fixing substrate; employing a adhering material to adhere the first glass plate to the first fixing substrate; and bending the first fixing substrate to bend the display module together with the first fixing substrate. The adhering material includes a solid adhesive and a liquid adhesive.

In the curved display panel and the method for manufacturing the curved display panel of the present invention, the display module having the first glass plate and the first fixing substrate are aligned and adhered firstly, and then the first fixing substrate is curved by exerting the force to act on first fixing substrate so as to bend the display module together with the first fixing substrate. In the process of bending the first glass plate, the force does not act on the first glass plate directly, but acts on the first fixing substrate to bend the first glass plate. As such, stress concentration of the first glass plate can be avoided, and thus the display module can be protected and product yield of the curved display panel can be improved. In addition, in the present invention, the adhering material for adhering the first glass plate to the first fixing substrate includes the solid adhesive and the liquid adhesive. The solid adhesive and the liquid adhesive have various properties. The solid adhesive has high stickiness, but air bubbles are easily generated when using the solid adhesive. The liquid adhesive has low stickiness, but air bubbles are not easily generated when using the liquid adhesive. The combination of the solid adhesive and the liquid adhesive can improve the stickiness and the product yield.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
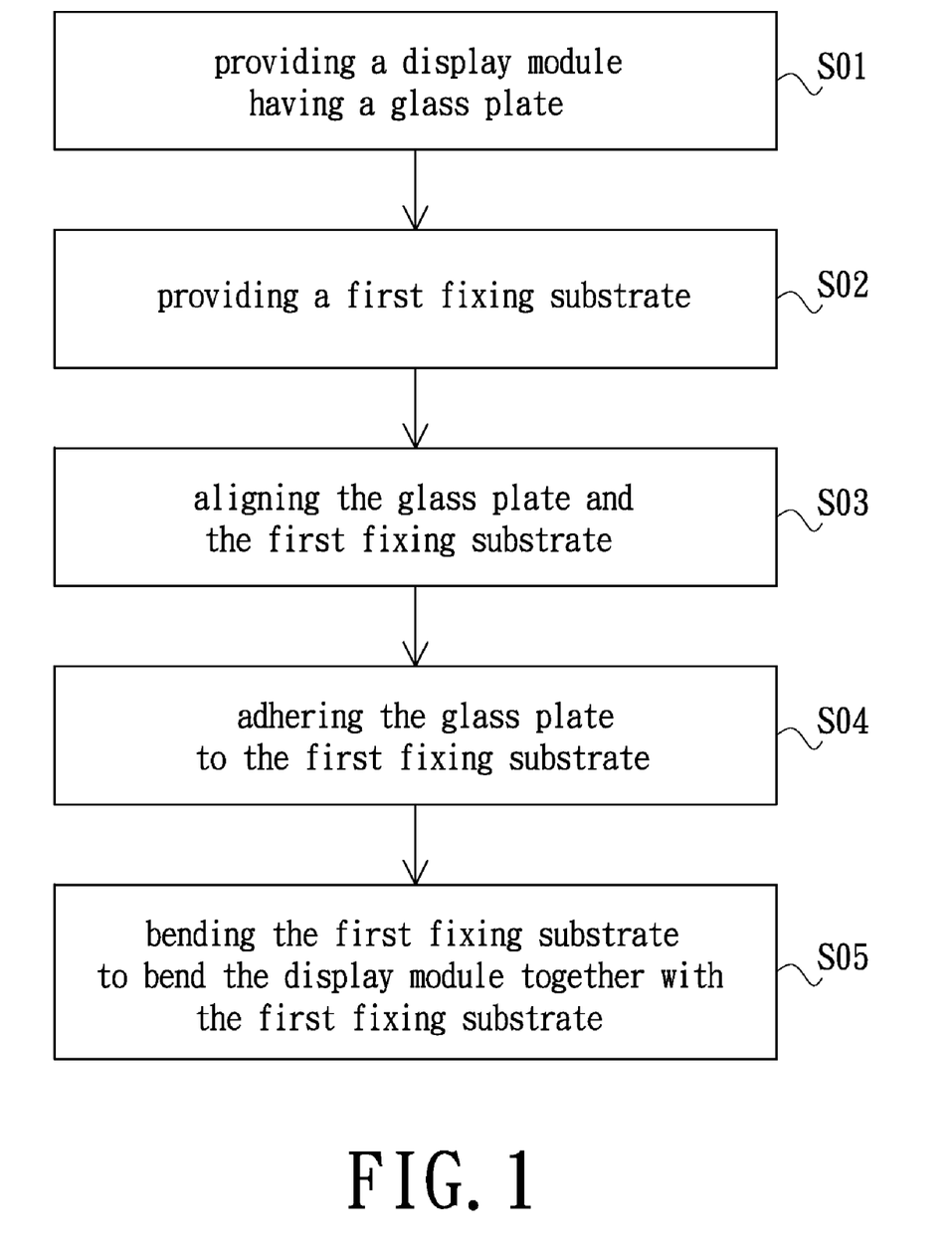
FIG. 1 is a flow chart of a method for manufacturing a curved display panel according to a first embodiment of the present invention.

FIG. 1 is a flow chart of a method for manufacturing a curved display panel according to a first embodiment of the present invention. The method for manufacturing the curved display panel includes steps S01~S05. Hereinafter, the method would be described with FIG. 1 and other FIGS.

Figure 2:
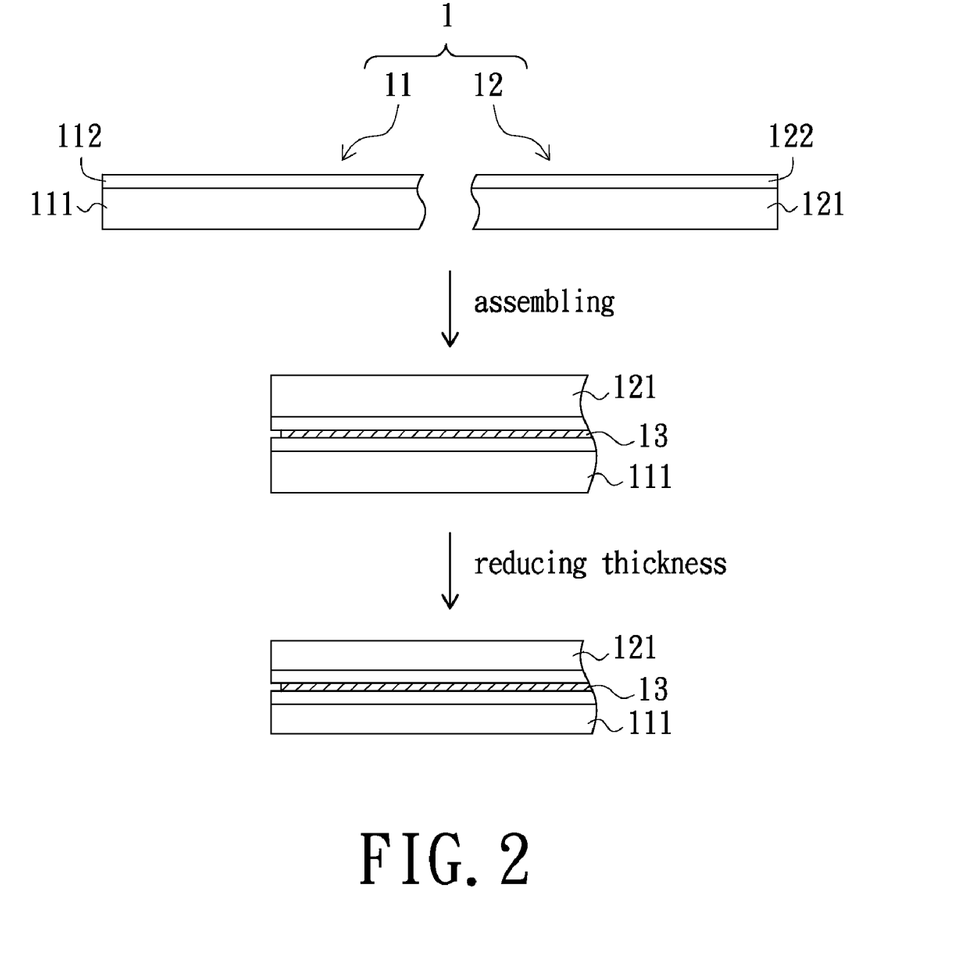
FIG. 2 is a schematic view showing a display module of the curved display panel during processes of assembling and reducing thickness according to the first embodiment of the present invention.

Referring to FIG. 2, in the step S01, a display module 1 having a glass plate 111 or 121 is provided. Hereinafter, the glass plate 111 is named as a first glass plate 111, and the glass plate 121 is named as a second glass plate 121. The display module 1 of the present invention has a glass plate, and the display module 1 is not limited to a special one. For example, the display module 1 can be a liquid crystal display module, an organic light-emitting diode display module, an electronic paper display module or a light emitting diode display module. In the first embodiment, the display module 1 is the liquid crystal display module for an exemplary purpose.

The display module 1 includes a first substrate 11 and a second substrate 12. The first substrate 11 has the first glass plate 111. The second substrate 12 has the second glass plate 121. In the first embodiment, the first substrate 11 is a thin film transistor substrate, and the second substrate 12 is a color filter substrate. The first glass plate 111 has a first component layer 112 disposed thereon, and the first component layer 112 mainly includes thin film transistors and pixel electrodes. The second glass plate 121 has a second component layer 122 disposed thereon, and the second component layer 122 mainly includes a color filter layer, a black matrix layer and a common electrode.

In the step S01 of providing the display module 1, the first substrate 11 and the second substrate 12 are further assembled, and a liquid crystal layer 13 is configured between the first substrate 11 and the second substrate 12. In the step S01, thicknesses of the first glass plate 111 and the second glass plate 121 may further be reduced, so that the first glass plate 111 and the second glass plate 121 become flexible plates. It should be understood that, if the first glass plate 111 and the second glass plate 121 are originally flexible plates, the process of reducing the thickness can be omitted. In addition, in another embodiment, the process of reducing the thickness can only be performed to reduce the thickness of one of the first glass plate 111 and the second glass plate 121. Herein, the thicknesses of the first glass plate 111 and the second glass plate 121 are reduced to less than 0.2 millimeters. The process of reducing the thicknesses of the first glass plate 111 and the second glass plate 121 can be performed by a chemical manner and/or a physical manner. The chemical manner is such as dry etching or wet etching. The physical manner is such as grinding and polishing. The chemical and physical manner is such as chemical-mechanical polishing (CMP).

Figure 3:
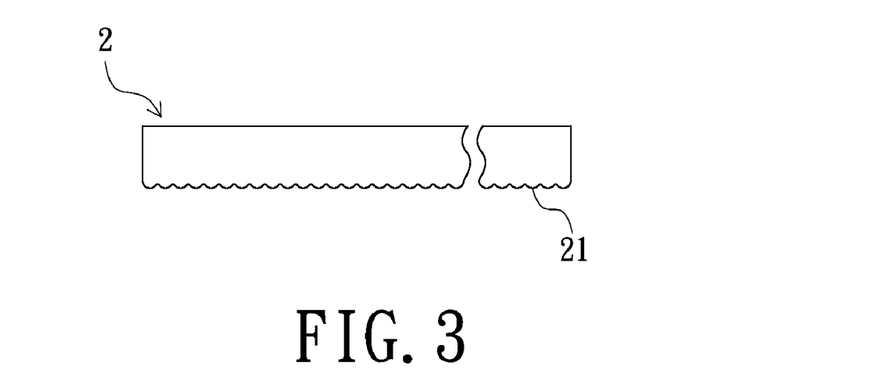
FIG. 3 is a schematic view showing a first fixing substrate of the curved display panel according to the first embodiment of the present invention.

Referring to FIG. 3, in the step S02, a first fixing substrate 2 is provided. In the first embodiment, the first fixing substrate 2 is a transparent and flexible substrate. The first fixing substrate 2 can be a plate-like shape or a sheet-like shape. The material of the first fixing substrate 2 can selected from the group consisting of polyethylene terephthalate (PET), Polycarbonate (PC), polystyrene (PS) and polymethyl methacrylate (PMMA). The first fixing substrate 2 can have a microstructure 21 disposed thereon. The microstructure 21 can be a concave-convex structure, microlenses or multilayer coating film and is used for regulating a transmission path of light in order to diffuse the light or condense the light. The microstructure 21 can also be used as a functional layer for achieving performances of scratch resistance, ultraviolet resistance and/or anti-fingerprint. In the first embodiment, the microstructure 21 is the concave-convex structure for the exemplary purpose. In addition, diffusion particles can be embedded in the first fixing substrate 2.

Figure 4:
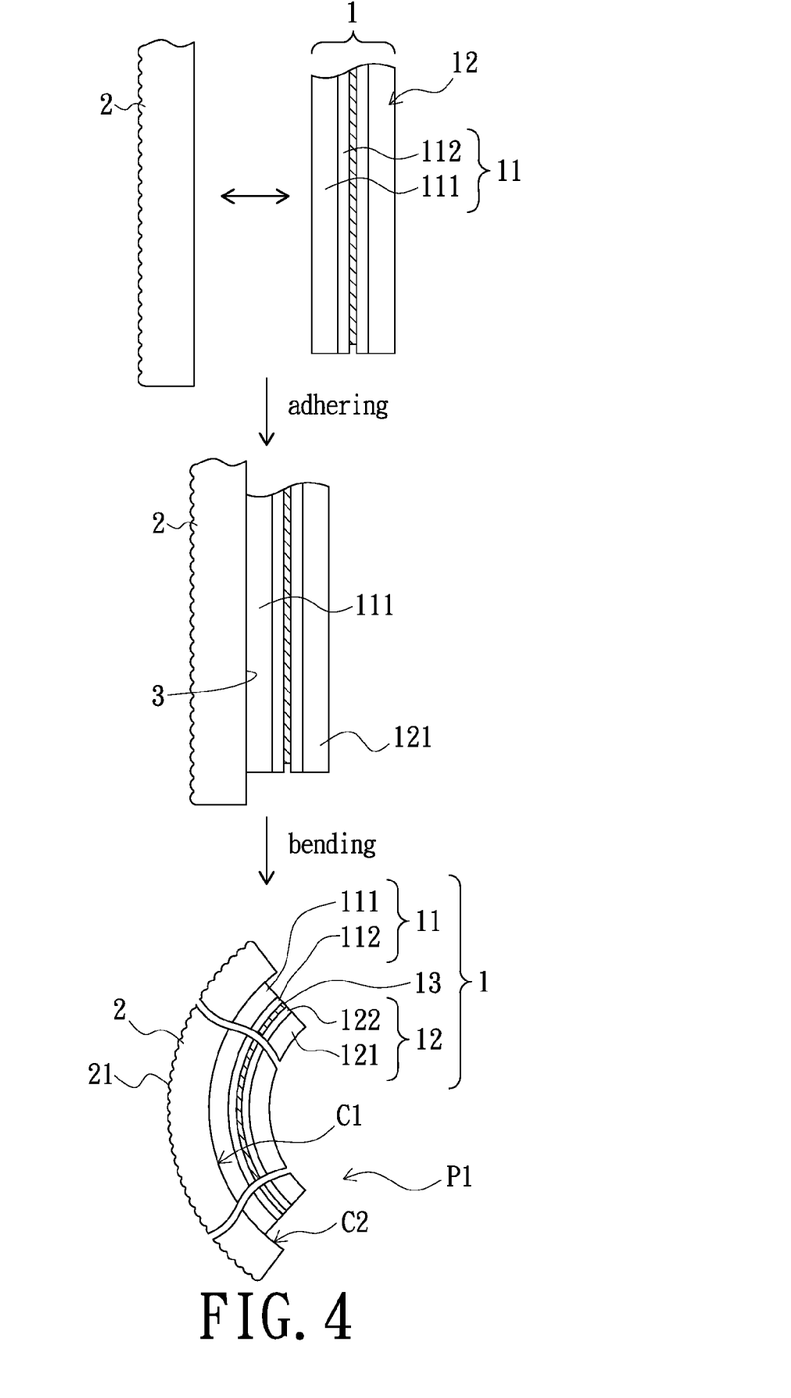
FIG. 4 is a schematic view showing the display module and the first fixing substrate of the curved display panel during processes of adhering and bending according to the first embodiment of the present invention.

FIG. 4 is a schematic view of the steps S03 to S05 of FIG. 1. In the step S03, the first glass plate 111 and the first fixing substrate 2 are aligned. In the step S04, the first glass plate 111 and the first fixing substrate 2 are adhered together. In the step S05, the first fixing substrate 2 is bended to bend the display module 1 together with the first fixing substrate 2.

In the first embodiment, the first fixing substrate 2 and the first glass plate 111 can be aligned by an aligning apparatus. After the aligning process, the first glass plate 111 and the first fixing substrate 2 are adhered together. In the present invention, the first glass plate 111 and the first fixing substrate 2 can be adhered by an adhering material including at least one adhesive.

Figure 5:
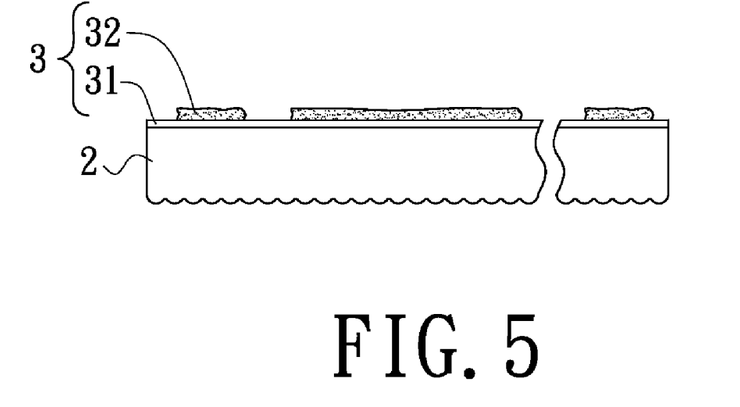
FIG. 5 is a schematic view showing the first fixing substrate and an adhering material of the curved display panel according to the first embodiment of the present invention.

Referring to FIG. 5, in the first embodiment, the adhering material 3 includes, for example, a solid adhesive 31 and a liquid adhesive 32. A refractive index of the solid adhesive 31 and/or a refractive index of the liquid adhesive 32 can be approximate to that of a glass. Herein, the solid adhesive 31 is such as an optically clear adhesive (OCA), and the liquid adhesive 32 is such as a super view resin (SVR).

In the process of adhering, the solid adhesive 31 can be firstly applied on the first fixing substrate 2 by a roller and then the liquid adhesive 32 is applied on the solid adhesive 31. Finally, the first glass plate 111 and the first fixing substrate 2 are adhered together by the solid adhesive 31 and the liquid adhesive 32. It should be understood that, in another embodiment, the solid adhesive 31 can be applied on the first glass plate 111 of the display module 1 firstly, and then the liquid adhesive 32 is applied on the solid adhesive 31. Finally, the first glass plate 111 and the first fixing substrate 2 are adhered together by the solid adhesive 31 and the liquid adhesive 32.

In the first embodiment, the first glass plate 111 and the first fixing substrate 2 are adhered together by the adhering material 3 including the solid adhesive 31 and the liquid adhesive 32. Therefore, some problems that are generated by employing the single adhesive in the process of adhering can be avoided. For example, the solid adhesive 31 has high stickiness, but some air bubbles are easily generated between the first glass plate 111 and the first fixing substrate 2 when only the solid adhesive 31 is used. In addition, when the process of adhering is performed by employing only the solid adhesive 31, the first fixing substrate 2 and the first glass plate 111 would be aligned by a suction method. The first glass plate 111 whose thickness is reduced may be easily damaged by the force of suction. In addition, although air bubbles would not be generated in the process of adhering by employing only the liquid adhesive 32, stickiness of the liquid adhesive 32 is relatively low so that the first glass plate 111 and the first fixing substrate 2 are not easily adhered together firmly. However, in the first embodiment, the liquid adhesive 32 directly contacts with the first glass plate 111, and most portions of the solid adhesive 31 do not contact with the support plate 111. Therefore, the air bubbles can be avoided. In addition, the stickiness of the liquid adhesive 32 can be reinforced by the solid adhesive 31, and therefore, the first glass plate 111 and the first fixing substrate 2 can be adhered together firmly to prevent the first glass plate 111 and the first fixing substrate 2 from being separated.

Referring to FIG. 4, after the process of adhering, a force is exerted at the first fixing substrate 2 to bend the first fixing substrate 2, so that the display module 1 adhered together with the first fixing substrate 2 is bended simultaneously, and the curved display panel P1 is formed. In the first embodiment, by exerting the force on two ends of the first fixing substrate 2, the first fixing substrate 2 is bended to have a curvature radius in the range from 10 millimeters to 500 millimeters. A surface of the first fixing substrate 2 facing the display module 1 can be bended to form a concave surface or a convex surface. Herein, the surface of the first fixing substrate 2 facing the display module 1 is the concave surface for the exemplary purpose. It should be understood that, the surface of the first fixing substrate 2 facing the display module 1 can be bended to form a combined structure of the concave surface and the convex surface, and the present invention is not limited herein.

In the curved display panel P1, the first glass plate 111 has a first curved surface C1, the first fixing substrate 2 has a second curved surface C2 facing the first curved surface C1, and the first curved surface C1 and the second curved surface C2 are adhered together by the adhering material 3. The curvature radiuses of the first curved surface C1 and the second curved surface C2 are in the range from 10 millimeters to 500 millimeters. The first curved surface C1 and the second curved surface C2 are the convex surface and the concave surface correspondingly that mate with each other. Herein, the first curved surface C1 is the convex surface, and the second curved surface C2 is the concave surface. In addition, the microstructure 21 of the first fixing substrate 2 is formed on a surface of the first fixing substrate 2 far away from the second curved surface C2.

After bending the first fixing substrate 2, the adhering material 3 can be further cured. A process of curing the curing the adhering material 3 can be performed according to a curing property of the adhering material 3. For example, if the adhering material 3 is a photo-curing material or a heat-curing material, the adhering material 3 can be cured by a photo-curing process or a heat-curing process correspondingly. After curing the adhering material 3, two polarized sheets can be disposed on surfaces of the second glass plate 121 of the second substrate 12 and the first fixing substrate 2 respectively. It should be understood that, the polarized sheets can be disposed on surfaces of the first glass plate 111 and the second glass plate 121 after the thicknesses of the first glass plate 111 and the second glass plate 121 being reduced.

It should be pointed that, due to the refractive index of the solid adhesive 31 and/or the refractive index of the liquid adhesive 32 being approximate to that of the glass, refraction angle of the light between the first curved surface C1 and the second curved surface C2 can be reduced. As such, a brightness of the curved display panel 1 can be improved.

Figure 6:
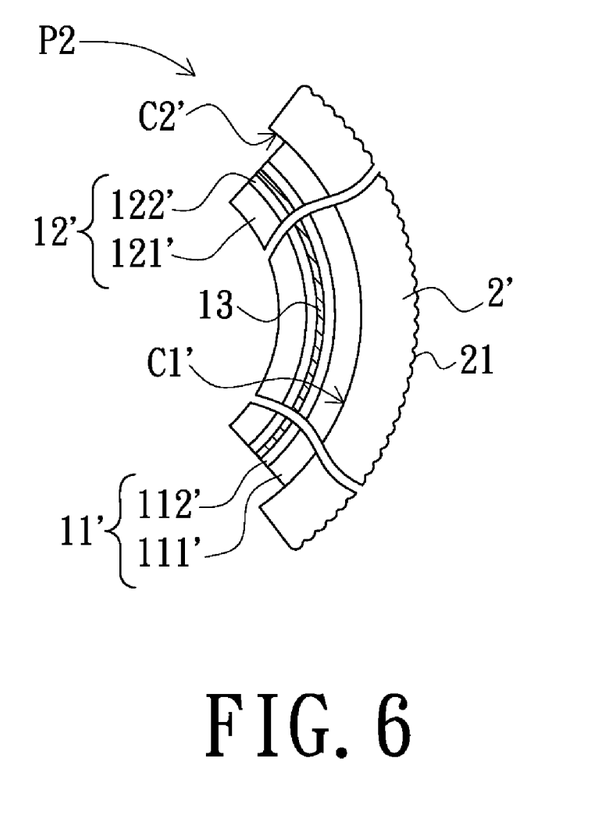
FIG. 6 is a schematic view of a curved display panel according to a second embodiment of the present invention.

In the first embodiment, the first plate 11 is the thin film transistor substrate, and the second plate 12 is the color filter substrate. That is, the first fixing substrate 2 is nearer to the thin film transistor substrate relative to the color filter substrate. FIG. 6 shows a curved display panel P2 according to a second embodiment of the present invention. As shown, in FIG. 6, the first substrate 11' is a color filter substrate, and the second plate 12' is a thin film transistor substrate. That is, a first fixing substrate 2' is nearer to the color filter substrate relative to the thin film transistor substrate. A first glass plate 111' of the first substrate 11' has a first component layer 112' disposed thereon, and the first component layer 112' mainly includes a color filter layer, a black matrix layer and a common electrode. A second glass plate 121' of the second plate 12' has a second component layer 122' disposed thereon, and the second component layer 122' mainly includes thin film transistors and pixel electrodes. The first fixing substrate 2' is adhered to the first glass plate 111' of the first substrate 11'. The first glass plate 111' has a first curved surface C1', and the first fixing substrate 2' has a second curved surface C2'. The first curved surface C1' and the second curved surface C2' are respectively a convex surface and a concave surface that mate with each other. A method for manufacturing the curved display panel P2 can be similar to the method for manufacturing the curved display panel P1, and it will not be repeated here.

In addition, in the first and second embodiments, the display modules are the liquid crystal display modules for the exemplary purpose, the first fixing substrates 2 and 2' should be transparent substrates, and the adhering materials should be transparent adhering materials. It should be understood that, if the display module is an organic light-emitting diode display module or an electronic paper display module that emits light from a single side, the first fixing substrate and the adhering material can be opaque.

Figure 7:
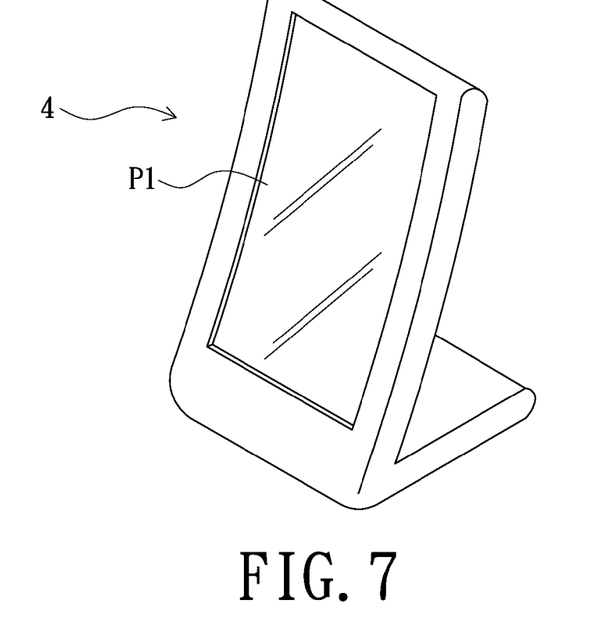
FIG. 7 is a schematic view of a curved display device having a curved display panel according to a third embodiment of the present invention.
Figure 8:
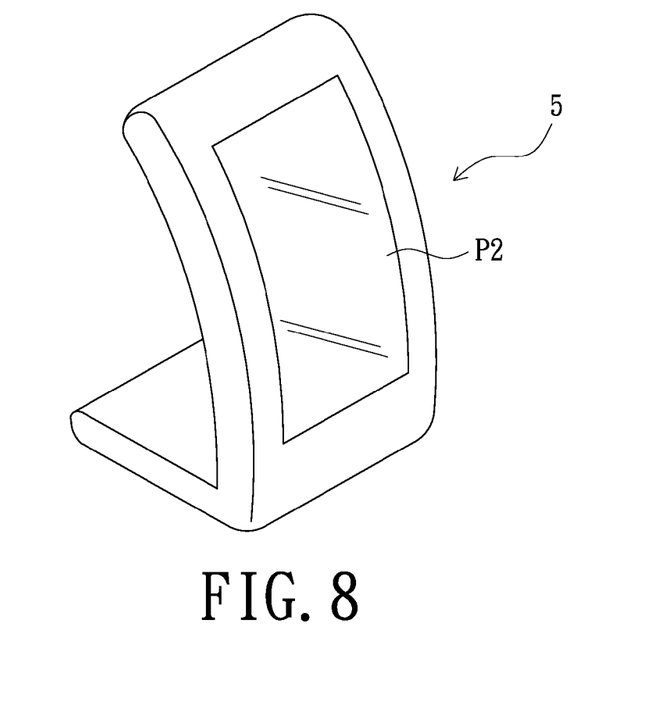
FIG. 8 is a schematic view of a curved display device having a curved display panel according to a fourth embodiment of the present invention.

FIG. 7 shows a curved display device 4 according to a third embodiment of the present invention. FIG. 8 shows a curved display device 5 according to a fourth embodiment of the present invention. The curved display devices 4 and 5 have the curved display panels P1 and P2 respectively. The curved display devices 4 and 5 can be composed of the curved display panels P1 and P2 respectively and other needed components, such as backlight modules, drive circuits and housings. The curved display devices 4 and 5 are a concave display device and a convex display device respectively. The concave display device and the convex display device are defined according to a display surface of the display device facing a viewer. For example, if the display surface of the display device facing the viewer is concave surface, the display device is the concave display device.

Figure 9:
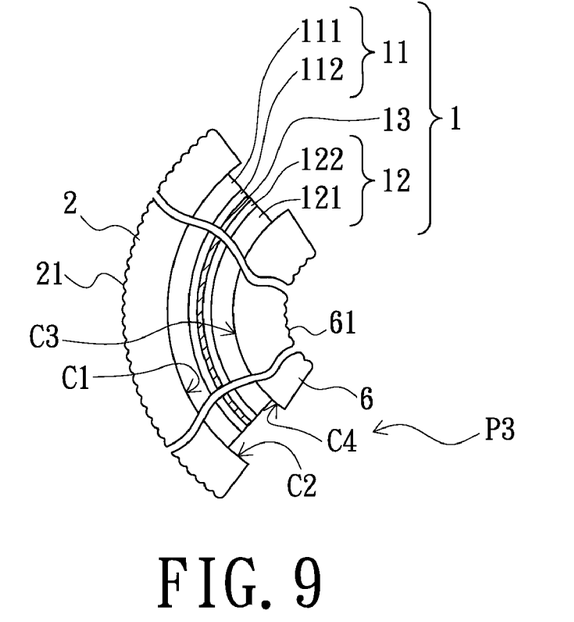
FIG. 9 is a schematic view of a curved display panel according to a fifth embodiment of the present invention.

FIG. 9 shows a curved display panel P3 according to a fifth embodiment of the present invention. The curved display panel P3 is similar in principle to the curved display panel P1, and the difference lies in that the curved display panel P3 further includes a second fixing substrate 6, and that a second glass plate 121 has a third curved surface C3. The second fixing substrate 6 has a fourth curved surface C4 facing the third curved surface C3. The above-mentioned adhering material is further connected between the third curved surface C3 and the fourth curved surface C4. Curvature radiuses of the third curved surface C3 and the fourth curved surface C4 are such as in the range from 10 millimeters to 500 millimeters. The third curved surface C3 and the fourth curved surface C4 are a concave surface and a convex surface respectively that mate with each other. A material of the second fixing substrate 6 is the same as that of a first fixing substrate 2, and it will not be repeated here. In addition, similar to the first fixing substrate 2, the second fixing substrate 6 can also have a microstructure 61. The microstructure 61 is formed on a surface of the second fixing substrate 6 far away from the fourth curved surface C4. A shape and a function of the microstructure 61 are similar to the microstructure 21 of the first fixing substrate 2, and it will not be repeated here.

A method for manufacturing the curved display panel P3 is similar in principle to the method for manufacturing the curved display panels P1, and the difference lies in that in the process of aligning the first fixing substrate 2 and a first glass plate 111, the second fixing substrate 6 and the second glass plate 121 are also aligned. In the process of adhering the first glass plate 111 to the first fixing substrate 2, the second glass plate 121 is also adhered to the second fixing substrate 6. In the process of bending the first fixing substrate 2, the second fixing substrate 6 is also bended, and that means that the first fixing substrate 2 and the second fixing substrate 6 are bended simultaneously. Because the curved display panel P3 of the fifth embodiment has the first fixing substrate 2 and the second fixing substrate 6, the display module 1 can be well protected, and the display module 1 can be kept in a bended state steadily.

Figure 10:
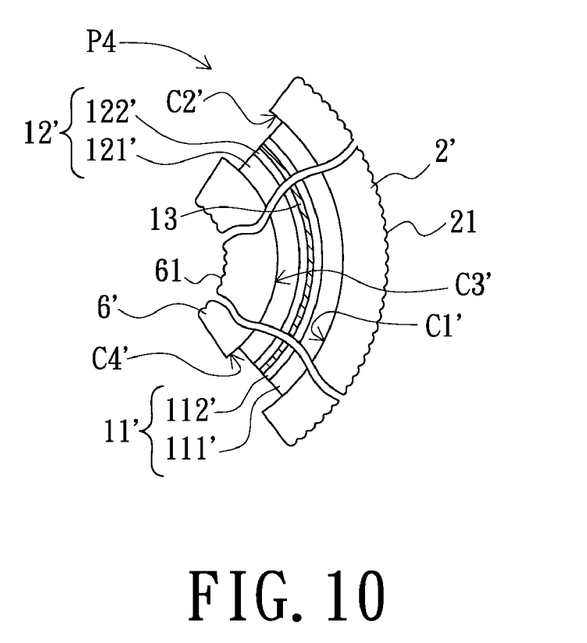
FIG. 10 is a schematic view of a curved display panel according to a sixth embodiment of the present invention.

FIG. 10 shows a curved display panel P4 according to a sixth embodiment of the present invention. The curved display panel P4 is similar in principle to the curved display panel P2, and the difference lies in that the curved display panel P4 further includes a second fixing substrate 6', and that a second glass plate 121' has a third curved surface C3'. The second fixing substrate 6' has a fourth curved surface C4' facing the third curved surface C3'. The above-mentioned adhering material is further connected between the third curved surface C3' and the fourth curved surface C4'. Curvature radiuses of the third curved surface C3' and the fourth curved surface C4' are such as in the range from 10 millimeters to 500 millimeters. The third curved surface C3' and the fourth curved surface C4' are a concave surface and a convex surface respectively that mate with each other. A material of the second fixing substrate 6' is the same as that of a first fixing substrate 2', and it will not be repeated here. A method for manufacturing the curved display panel P4 is similar in principle to the method for manufacturing the curved display panel P3, and it will not be repeated here. In addition, the curved display panel P4 has advantages similar to that of the curved display panel P3 of FIG. 9.

In summary, in the curved display panel and the method for manufacturing the curved display panel of the present invention, the display module having the first glass plate and the first fixing substrate are aligned and adhered firstly, and then the first fixing substrate is curved by exerting the force to act on first fixing substrate so as to bend the display module together with the first fixing substrate. In the process of bending the first glass plate, the force does not act on the first glass plate directly, but acts on the first fixing substrate to bend the first glass plate. As such, stress concentration of the first glass plate can be avoided, and thus the display module can be protected and product yield of the curved display panel can be improved. In addition, in the present invention, the adhering material for adhering the first glass plate to the first fixing substrate includes the solid adhesive and the liquid adhesive. The solid adhesive and the liquid adhesive have various properties. The solid adhesive has high stickiness, but air bubbles are easily generated when using the solid adhesive. The liquid adhesive has low stickiness, but air bubbles are not easily generated when using the liquid adhesive. The combination of the solid adhesive and the liquid adhesive can improve the stickiness and the product yield.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A curved display panel comprising:
    a display module having a first substrate and a second substrate, the first substrate having a first glass plate, and the first glass plate having a first curved surface;
    a first fixing substrate having a second curved surface facing the first curved surface, the first glass plate being disposed between the first fixing substrate and the second substrate;
    an adhering material connected between the first curved surface and the second curved surface; and
    a second fixing substrate, wherein the second substrate having a second glass plate, the second glass plate having a third curved surface, the second fixing substrate having a fourth curved surface facing the third curved surface, and the adhering material being further connected between the third curved surface and the fourth curved surface.

2. The curved display panel as claimed in claim 1, wherein the first fixing substrate is a transparent substrate.

3. The curved display panel as claimed in claim 1, wherein the first fixing substrate is a flexible substrate.

4. The curved display panel as claimed in claim 1, wherein a thickness of the first glass plate is less than 0.2 millimeters.

5. The curved display panel as claimed in claim 1, wherein the first fixing substrate has a microstructure disposed thereon.

6. The curved display panel as claimed in claim 5, wherein the microstructure is formed on a surface of the first fixing substrate far away from the second curved surface.

7. The curved display panel as claimed in claim 1, wherein the first substrate is a thin film transistor substrate, and the second substrate is a color filter substrate.

8. The curved display panel as claimed in claim 1, wherein the first substrate is color filter substrate, and the second substrate is a thin film transistor substrate.

9. The curved display panel as claimed in claim 1, wherein a thickness of the second glass plate is less than 0.2 millimeters.

10. The curved display panel as claimed in claim 1, wherein the second fixing substrate has a microstructure disposed thereon.

11. The curved display panel as claimed in claim 10, wherein the microstructure is formed on a surface of the second fixing substrate far away from the fourth curved surface.

12. The curved display panel as claimed in claim 1, wherein curvature radiuses of the third curved surface and the fourth curved surface are in the range from 10 millimeters to 500 millimeters.

13. The curved display panel as claimed in claim 1, wherein curvature radiuses of the first curved surface and the second curved surface are in the range from 10 millimeters to 500 millimeters.

14. The curved display panel as claimed in claim 1, wherein the adhering material is a transparent adhering material.

15. The curved display panel as claimed in claim 1, wherein the adhering material comprises a solid adhesive and a liquid adhesive.

16. The curved display panel as claimed in claim 15, wherein a refractive index of the solid adhesive and/or the liquid adhesive approximates to a refractive index of a glass.

17. A method for manufacturing a curved display panel, comprising:
    providing a display module having a first substrate and a second substrate, the first substrate having a first glass plate;
    providing a first fixing substrate;
    aligning the first glass plate and the first fixing substrate, the first glass plate being disposed between the first fixing substrate and the second substrate;
    adhering the first glass plate to the first fixing substrate; and
    bending the first fixing substrate to bend the display module together with the first fixing Substrate;
    wherein the second substrate has a second glass plate, the process of providing the first fixing substrate further comprises providing a second fixing substrate, the process of aligning the first glass plate and the first fixing substrate further comprises aligning the second glass plate and the second fixing substrate, the process of adhering the first glass plate to the first fixing substrate further comprises adhering the second glass plate to the second fixing substrate, and the process of bending the first fixing substrate further comprises bending the second fixing substrate, the display module is disposed between the first fixing substrate and the second fixing substrate and the second glass plate is disposed between the second fixing substrate and the first substrate.

18. The method as claimed in claim 17, further comprising reducing a thickness of the first glass plate before adhering the first glass plate to the first fixing substrate.

19. The method as claimed in claim 18, wherein the thickness of the first glass plate is reduced to less than 0.2 millimeters.

20. The method as claimed in claim 17, wherein a curvature radius of the first fixing substrate is in the range from 10 millimeters to 500 millimeters after bending the first fixing substrate.

21. The method as claimed in claim 17, wherein the first glass plate and the first fixing substrate are adhered by an adhering material, and the adhering material comprises a solid adhesive and a liquid adhesive.

22. The method as claimed in claim 21, further comprising curing the adhering material connected between the first glass plate and the first fixing substrate after bending the first fixing substrate.

23. The method as claimed in claim 21, wherein the process of adhering the first glass plate to the first fixing substrate comprises:
   applying the solid adhesive to the first fixing substrate; and
   applying the liquid adhesive to the solid adhesive.

24. The method as claimed in claim 21, wherein the process of adhering the first glass plate to the first fixing substrate comprises:
   applying the solid adhesive to the first glass plate; and
   applying the liquid adhesive to the solid adhesive.

25. The curved display panel as claimed in claim 1, further comprising a second fixing substrate, the display module being disposed between the first fixing substrate and the second substrate.

26. The curved display panel as claimed in claim 25, wherein the second substrate has a second glass plate, the second glass plate is disposed between the second fixing substrate and the first substrate.

* * * * *